United States Patent [19]

Melzi et al.

[11] Patent Number: 4,648,434

[45] Date of Patent: Mar. 10, 1987

[54] ANTISKID DEVICE FOR MOTOR VEHICLE TIRES

[75] Inventors: Carlo Melzi; Paolo Gregorutti, both of Tarvisio, Italy

[73] Assignee: Acciaierie Weissenfels S.p.A., Tarvisio, Italy

[21] Appl. No.: 653,936

[22] Filed: Sep. 24, 1984

[30] Foreign Application Priority Data

Mar. 26, 1984 [IT] Italy .................................. 21361/84[U]

[51] Int. Cl.[4] ........................ B60C 27/10; B60C 27/06
[52] U.S. Cl. ................................. 152/213 A; 24/303; 152/217; 152/242; 403/344
[58] Field of Search ....... 152/213 R, 213 A, 216–218, 152/220, 225 R, 225 C, 172, 177, 179, 184, 191, 231, 239–242, 208; 81/15.8; 403/344; 24/68 CT, 69 TT, 70 TT, 189, 192, 199, 200, 241 PS, 303, 662

[56] References Cited

U.S. PATENT DOCUMENTS

| | | | |
|---|---|---|---|
| 1,059,182 | 4/1913 | Martin | 152/242 |
| 1,511,685 | 10/1924 | Spiro | 152/242 X |
| 1,745,273 | 1/1930 | Romain | 152/242 X |
| 2,493,263 | 1/1950 | Prehn | 152/241 |
| 2,639,753 | 5/1953 | Pike | 152/242 |

Primary Examiner—Michael Wityshyn
Assistant Examiner—Thomas Bokan

[57] ABSTRACT

Antiskid device for motor vehicle tires with an inner fastening or mounting engaging with the inside of the tire and with an inner fastening or mounting for chain strand portions extending over the tire tread, in which in the fitted state, the inner fastening has an approximately circular construction and has a central fastening section, to each of whose two ends is swivellably fixed a side part by means of a swivel joint and for fitting the inner fastening, the side parts can be opened outwards from the central fastening section and are in each case pretensioned by means of a spring device in the direction of a closed form of the inner fastening. In order to further facilitate fitting, particularly in the case of narrow or confined wheel cases, it is provided that the central fastening section comprises at least two portions, which are interconnected in a swivellable manner relative to one another and are also pretensioned in the direction of a closed form of the inner fastening.

5 Claims, 6 Drawing Figures

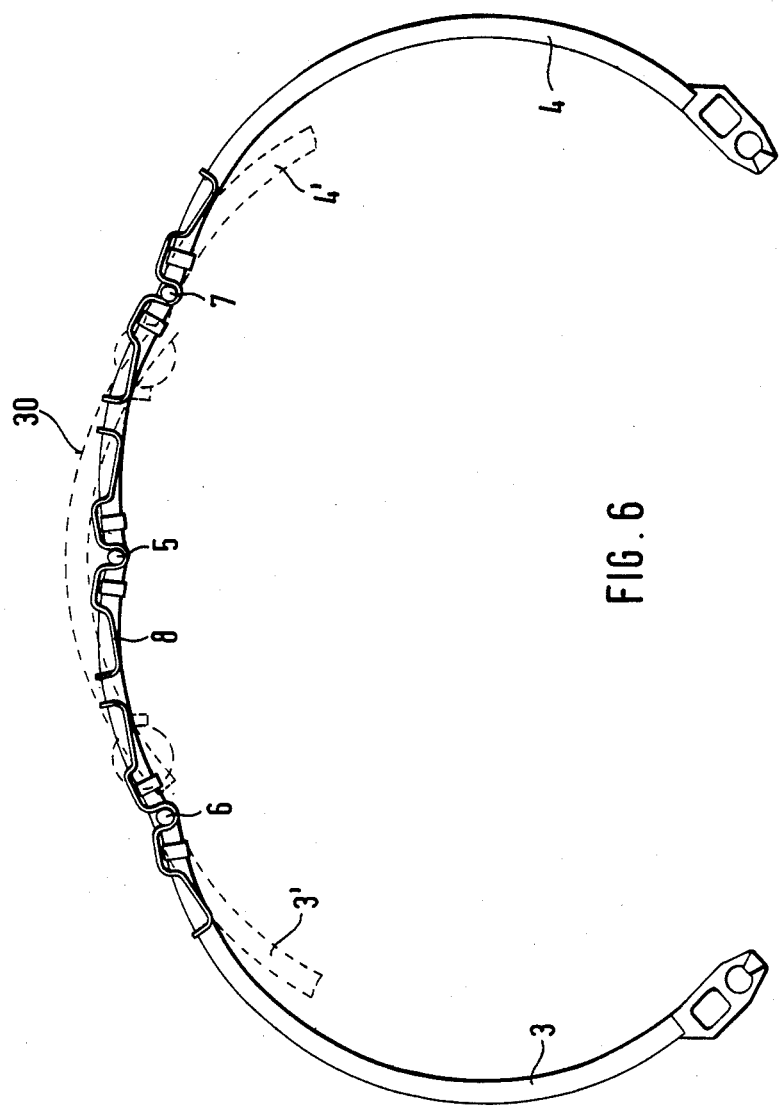

ANTISKID DEVICE FOR MOTOR VEHICLE TIRES

BACKGROUND OF THE INVENTION

The invention relates to an antiskid device for motor vehicle tires with an inner fastening or mounting engaging with the inside of the tire and with the inner fastening or mounting for chain strand portions extending over the tire tread, in which in the fitted state, the inner fastening has an approximately circular construction and has a central fastening section, to each of whose two ends is swivellably fixed a side part by means of a swivel joint and for fitting the inner fastening, the side parts can be opened outwards from the central fastening section and are in each case pretensioned by means of a spring device in the direction of a closed form of the inner fastening.

In the case of an antiskid chain of the aforementioned type, very easy fitting and completely uncomplicated operation is possible. Thus, for fitting purposes, the fitter only has to grip with the hands the two side parts of the inner fastening and swivel them radially outwards with respect to the central part until the inner fastening can be passed over the tire tread. The fitter must now release the two side parts, after which they are automatically swung into the position of the closed fastening on the inside of the tire, where they continue to be held under a given pretension.

However, it has been found that during the construction of the known antiskid chain with only a single rigid central part to which the side parts are fixed, particularly in the case of very small wheel cases and mudguards which are deep-seated relative to the tire, fitting can lead to certain difficulties, specifically when the rigid central part projects somewhat too far upwards after spreading apart the side parts and as a result of its given arcuate shape. In the case of large vehicles, where the wheel case have sufficient space, this has virtually no disadvantageous effects during fitting. However, in the case of small vehicles where the wheel cases are relatively small and narrow, fitting impediments can be caused.

BRIEF SUMMARY OF THE INVENTION

To obviate this problem and to further facilitate fitting in the case of narrow wheel cases, whilst retaining the otherwise advantageous characteristics of the present type of chain, the present invention proposes in connection with such an antiskid chain that the central fastening section comprise at least two portions, which can be swivelled relative to one another, are interconnected and are also pretensioned in the direction of a closed form of the inner fastening. Pretensioning is preferably brought about by means of suitable spring devices or elastic inserts. As a result of the measures according to the invention, on spreading apart the two side parts and fitting the central fastening section, its arcuate sectional shape is not retained unchanged and instead through the subdivision into two or more portions which are in each case articulated to one another and reciprocally pretensioned in the direction of a closed fastening, a "flattening" takes place in such a way that the projection of the central fastening section (upwards projection) is smaller than in the case of its one-part construction. A definite space-saving effect is obtained if the central fastening section is subdivided into two portions. It is of particular advantage in this connection if suitable measures are used to ensure that a relative reciprocal spreading apart of all components of the rear fastening is only possible in the direction of an opening movement with respect to the circular shape (i.e. fundamentally only an outwards expansion).

In the end region of their facing corners, the portions are advantageously interconnected by means of a swivel joint or an elastic joint. The elastic joint could e.g. be constituted by suitable joints or intermediate pieces made from an elastic plastics material.

As stated hereinbefore, a particularly advantageous development of the invention is obtained through constructing the central fastening section from two portions. However, it can also be advantageous in certain cases to use a plurality of portions, three to five portions being advantageously used for the central fastening section.

Preferably, leg springs are used for pre-tensioning the portions and the central region thereof is supported on the swivel joint, whilst their legs are in each case supported on the individual portions. This leads to a simply constructed and easily manufacturable construction in which relatively little space is required and which can also be produced in an inexpensive manner. Such leg springs can be easily produced, it being recommended to use identically shaped leg springs for all the swivel joints on the inner fastening.

It is also advantageous to arrange stops for some or all the swivel joints in such a way that in each case when two portions reach a reciprocal or opposite position in which they together form an arcuate section (i.e. the two parts are juxtaposed in their final fitting position), they are locked against further swivelling in the pretensioning direction. Preferably, additional stops can be provided in such a way that the portions can only be swivelled by a given spreading or expansion angle relative to one another. This makes it possible to prevent accidental over-expansion or overspreading of the rear fastening, so that fitting is facilitated.

A particularly simple, appropriate, rapidly fittable and inexpensive configuration of the antiskid device according to the invention comprises the ends of in each case two portions rotatably fixed to one another project somewhat over the swivel joint and that in the vicinity of these free ends stops are fixed to the other portion, which are constructed in the form of a U-shaped clip and embrace the portion in such a way that between the central web of the clip connecting the two clip legs and a lateral face of the portion a gap is formed in which engages the free end of the other portion projecting over the swivel joint.

If an excessive expansion angle should then occur during expansion, the free end of the other portion within the gap runs against one of the two clip legs limiting the end of the gap and which serves as a stop there. The height of the gap defines the spreading angle.

Advantageously, the stop is constructed as a round clip completely surrounding the profile cross-section of the portion and whose cross-section is shaped in such a way that its inner faces are parallel to the outer faces of the profile cross-section of the portion and project therefrom on one side of the portion for forming the said gap.

BRIEF DESCRIPTION OF THE DRAWINGS

The invention is described in greater detail hereinafter relative to non-limitative embodiments and the attached drawings, wherein show:

FIG. 6 a fastening according to the invention in the spread-out position (the broken line illustrating a prior art one-piece central portion of constant shape).

DETAILED DESCRIPTION OF THE PREFERRED EMBODIMENTS

Figure 1:
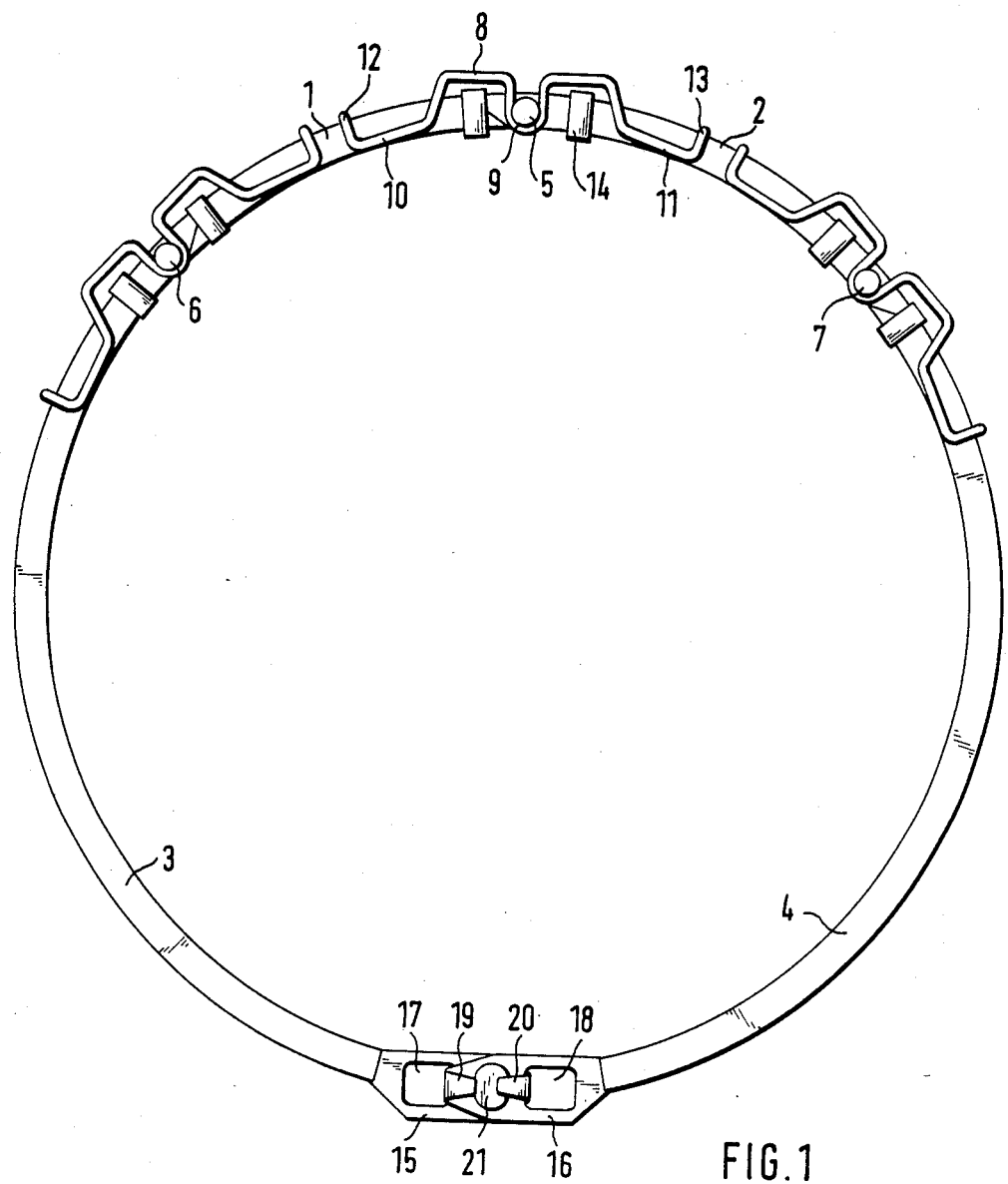
FIG. 1 a view of an antiskid device fastening according to the invention (view in the direction of the inside of the tire).

In the representations according to FIGS. 1 and 6, in each case only the inner fastening of an antiskid device is shown in a view towards the inside of the wheel. In order not to overburden the drawing, neither the outer fastening, nor the chain strand portions extending over the tire tread, nor their fixing points to the fastening are shown.

The inner fastening of FIG. 1 comprises at the top a central mounting section formed by two portions 1 and 2, side parts 3 and 4 being swivellably fitted to the free end of each of the portions 1 and 2 by means of joints 6 and 7. The two portions 1 and 2 of the central section of the fastening are also interconnected by means of a joint 5 in such a way that they can be swivelled relative to one another. As a result of a suitable choice of stops, it must be ensured that turning of the individual portions of the rear (inner) fastening can only take place in the sense of a spreading apart of the circular cross-section and not in the sense of a reduction thereof.

A leg spring 8 is fitted to the joint 5 between portions 1 and 2, as well as to the joints 6 and 7, to which side parts 3 and 4 are fitted. The leg spring has a suitable shape, so that its central portion is supported on joint 5 (embracing the latter from below), whilst its one leg 10 is supported by means of its hook-like end 12 from above on portion 1, which it overlaps, whilst the other leg 11 of leg spring 8 is supported with its hook-like ends 13 from above on the portion 2, which it overlaps. Specific reference is made to the construction and shaping of the leg springs 8 shown particularly in FIGS. 1, 2 and 3. As a result of the appropriate construction of the leg springs, it is ensured that the two portions 1 and 2 are pretensioned in the direction of a closed form of the inner fastening (i.e. in the direction of an acceptance of the circular cross-section). The tension of spring legs 10, 11 on the hook-like ends 12 and 13 from the radially outer side acts on portions 1 and 2, so that they are compressed in the sense of a collapsing effect. However, due to the fact that the leg springs 8 have a recess 9 in the central portion thereof by means of which there is a support on joint 5 (e.g. a projecting joint bolt, pivot pin, etc) that this is radially forced outwards, it is possible in a simple manner to achieve the desired pretensioning in the direction of a closed position as a result of a simple, but effective construction and supporting of such leg springs 8.

Figure 2:
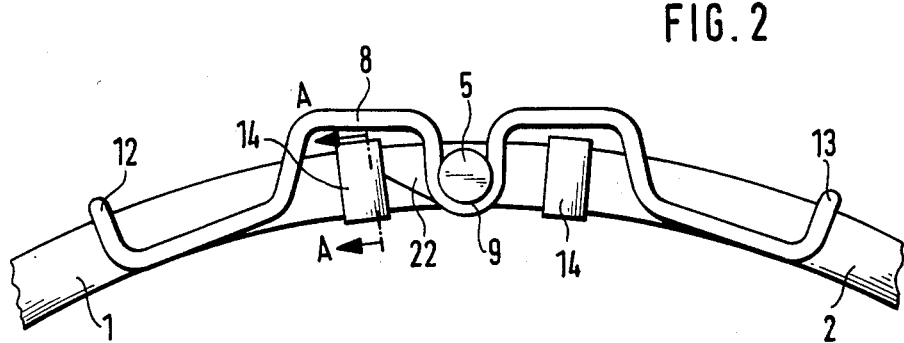
FIG. 2 a larger scale detail of the fastening of FIG. 1 to illustrate the conditions in a joint area between two portions.
Figure 3:
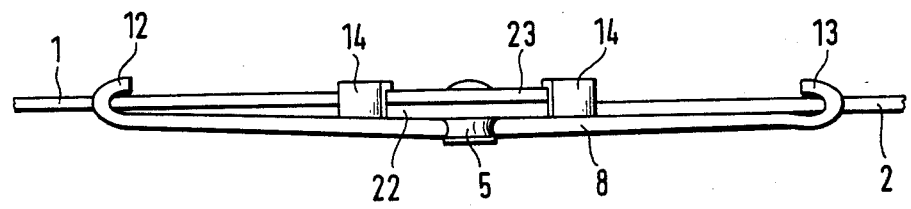
FIG. 3 a plan view of the representation of FIG. 2.
Figure 4:
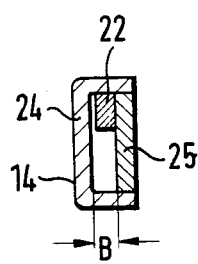
FIGS. 4 and 5, two developments for a section possibility along A—A of FIG. 2.
Figure 5:
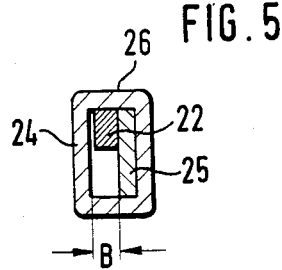

As can be seen in FIGS. 1 and 2, the joint 5 between the two portions 1 and 2 is positioned at a certain distance from the end thereof and not at the specific end. FIG. 2 further shows that e.g. end 22 of portion 2 projects beyond joint 5. The radially outer face constitutes an extension of the radially outer face of portion 2, whilst the bottom of the projecting part has a bevelled configuration, cf FIG. 2. This projecting "nose" 22, which is formed by the end of side part 2 projects into a gap B (cf FIGS. 4 and 5) formed between the central web 24 of the U-shaped stop clip 14 on the one hand and the facing lateral face of the profile cross-section 25 of end 23 of portion 1 on the other. As shown in cross-section in FIG. 4, clip 14 overlaps with its lateral legs from the top and bottom the profile cross-section 25 and is fixed thereto at this point in an appropriate manner. Fixing can e.g. take place by lateral welding, bonding, etc. However, the stop can also be constructed in a different way, such as is shown in FIG. 5, namely in the form of an all-round hollow cross-section (round clip) 26, which only differs from the cross-section of FIG. 4 in that the two lateral legs of clip 14 are supplemented here to form a solid cross-section. On one side, the round clip projects over a lateral face of portion 1 (profile cross-section 25) accompanied by the formation of gap B. Here again, the cross-section of the free end 22 of portion 2 engages in this gap and is movable therein from top to bottom in accordance with the rotation. The position shown in FIGS. 2, 4 and 5 is the inoperative position (final fitting position), in which the end 22 of portion 2 (or the corresponding end 23 of portion 1 at the back of FIG. 2) engages at the top with stop 14 or 26 within gap B. This ensures that under the action of spring tensions the two portions 1 and 2 can only be swivelled towards one another until an arcuate section is obtained. As a result of the stop means configuration, no further folding or collapsing together is possible as this is also undesired. Stops 14 are provided both for the free end 22 of portion 2 and for the free end 23 of portion 1 (cf FIG. 3), the two gaps B being formed on different sides of the rear fastening.

In the same way as with the arrangement of FIG. 2, it is also possible to choose the arrangement at articulation points 6 and 7 between in each case one portion 1 or 2 and the side part 3 or 4 articulated thereto.

It can be gathered from FIG. 1 that the free ends of side parts 3 and 4 which are turned towards one another are provided with a suitable locking device which, for example, comprises a plate-like end part 15 or 16. At the free end of each of the said end parts is provided a nose 19 or 20 bent over counter to the closing direction, as well as an engagement opening 17 or 18. On closing, initially the hook-like, bent-over noses 19 or 20 meet one another at their bend points, so that one is deflected to the rear and the other to the front. The closing process then continues until the nose located on the side facing the wheel flank has moved to such an extent on the other side part to enable it to hook it into its opening 18. Through the provision of suitable magnets 21, it is possible to particularly easily ensure that also in the hooked-in position of nose 20, the two end parts 15 and 16 are drawn against one another by the relevant magnets.

FIG. 6 finally shows a fastening according to the invention in which the side parts 3 and 4 are spread apart for fitting purposes. The broken line configuration shows the case of the prior art antiskid device, in which the central portion 30 has a rigid form. The side parts are designated therein 3' and 4'. It can be seen that in the case of the inner fastening according to the invention, there is a definite flattening in the central fastening section (i.e. the section of the inner fastening formed between the articulation points 6 and 7 of side parts 3 and 4). However, there is a much larger projection in the case of the rigid shape of the central portions in the prior art chain.

Advantageously, the individual parts of the inner fastening are made from flat metal sheeting, as can be seen from FIGS. 2 to 5. It is obviously possible to use in place of leg springs 8, other suitable spring means, such as spiral springs, which e.g., pass around the articulation point 5, or appropriately fitted leaf springs and the like.

What is claimed is:

1. An antiskid device mountable on motor vehicle tires and comprising an inner fastening adapted to engage the inside of a tire, said inner fastening in both its unmounted and mounted or fitted state on the tire normally having an essentially circular form and comprising a central mounting portion having free ends swivably connected to side part portions by swivel joints, the side part portions, for facilitating fitting the inner fastening to the inside of the tire, being radially outwardly movable relative to the central mounting portion when said inner fastening is in the normal essentially circular form and being normally pretensioned by spring means in both its unmounted and mounted or fitted state to automatically urge said side part portions into closed form, the central mounting portion comprising at least two portions swivably connected by a swivel joint for movement toward one another and being also pretensioned by spring means in a radially inward direction so that the inner fastening, constituted of said central mounting portion and said side part portions, is normally in said essentially circular form in both its unmounted and mounted or fitted state, all said spring means comprising leg springs having an intermediate part supported on the swivel joints and outer leg parts supported on associated of said central and side part portions of said inner fastening, and stop means for said swivel joints and said portions interconnected thereby for locking against further swivelling movement of said portions in a first direction beyond said essentially circular form one said essentially circular form is attained and in a second direction to limit movement of said portions when said side part portions are moved in a direction away from said essentially circular form.

2. An antiskid device according to claim 1, wherein the central mounting portion comprises at least three and a maximum of five portions.

3. An antiskid device according to claim 1, wherein adjacent portions of the inner fastening overlap, a swivel joint being provided in each of the overlapping portions, said stop means being fixed at the free ends of said adjacent portions, one at each side of said swivel joint, each of said stop means comprising a U-shaped clip the base of which defines a central web which joins the legs of the U, each U-shaped clip having passed therethrough one of the adjacent portions, the lateral face of which defines a space in relation to said central web, the free end of the other adjacent portion being received in said space.

4. An antiskid device according to claim 3, wherein the stop means comprises a closed-loop clip which completely surrounds the profile cross-section of said one portion.

5. An antiskid device according to claim 3, wherein the free ends of the other portions are received in said spaces and between the legs of the U-shaped clips, said free ends having an extent shorter than the distance between said legs of the U-shaped clip, each leg defining a limit beyond which said free ends cannot move.

* * * * *